Nov. 25, 1930.    J. B. JACKSON    1,782,782
WEFT STOP MECHANISM FOR LOOMS
Filed March 14, 1930    4 Sheets-Sheet 2
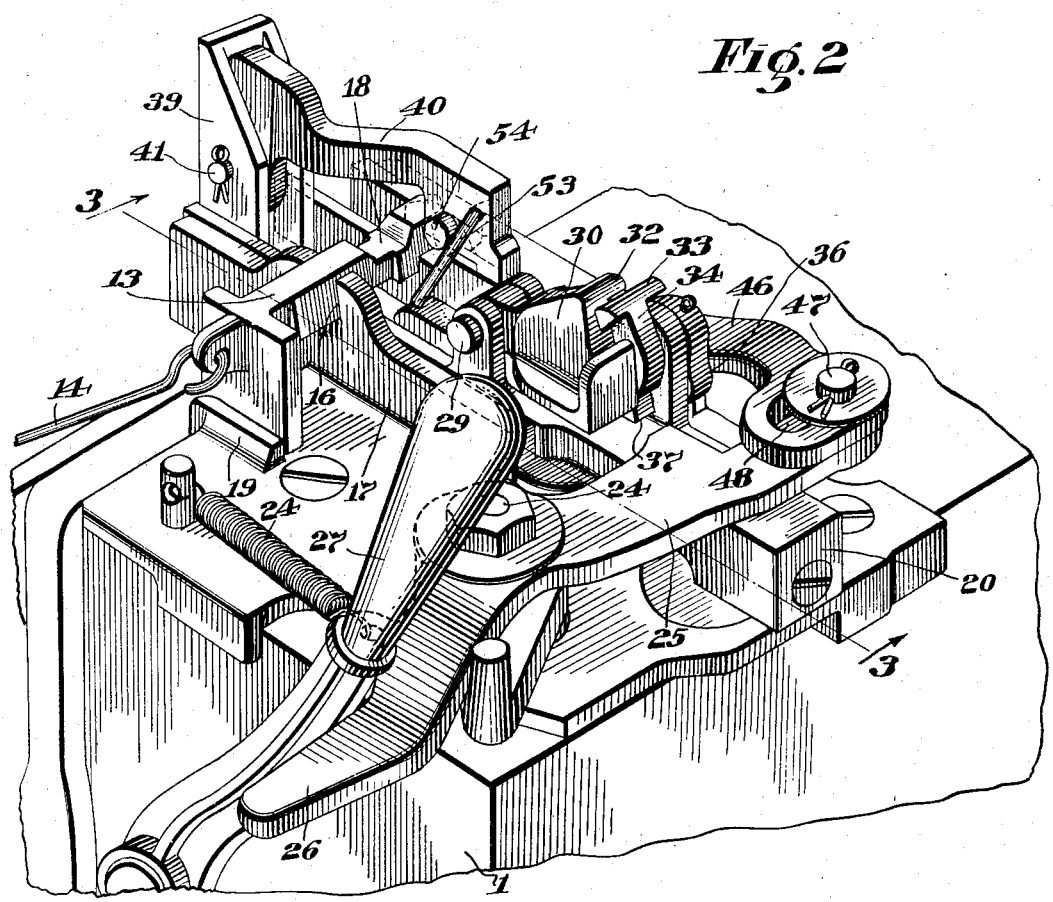
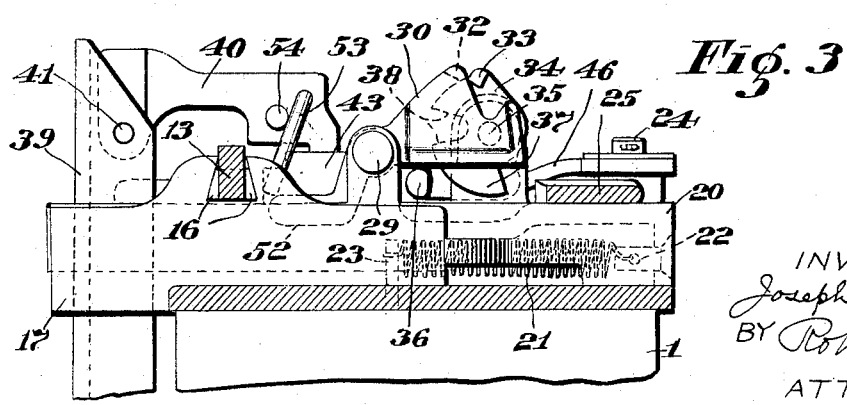
INVENTOR:
Joseph B. Jackson
BY Robt. C. Haines
ATTORNEY

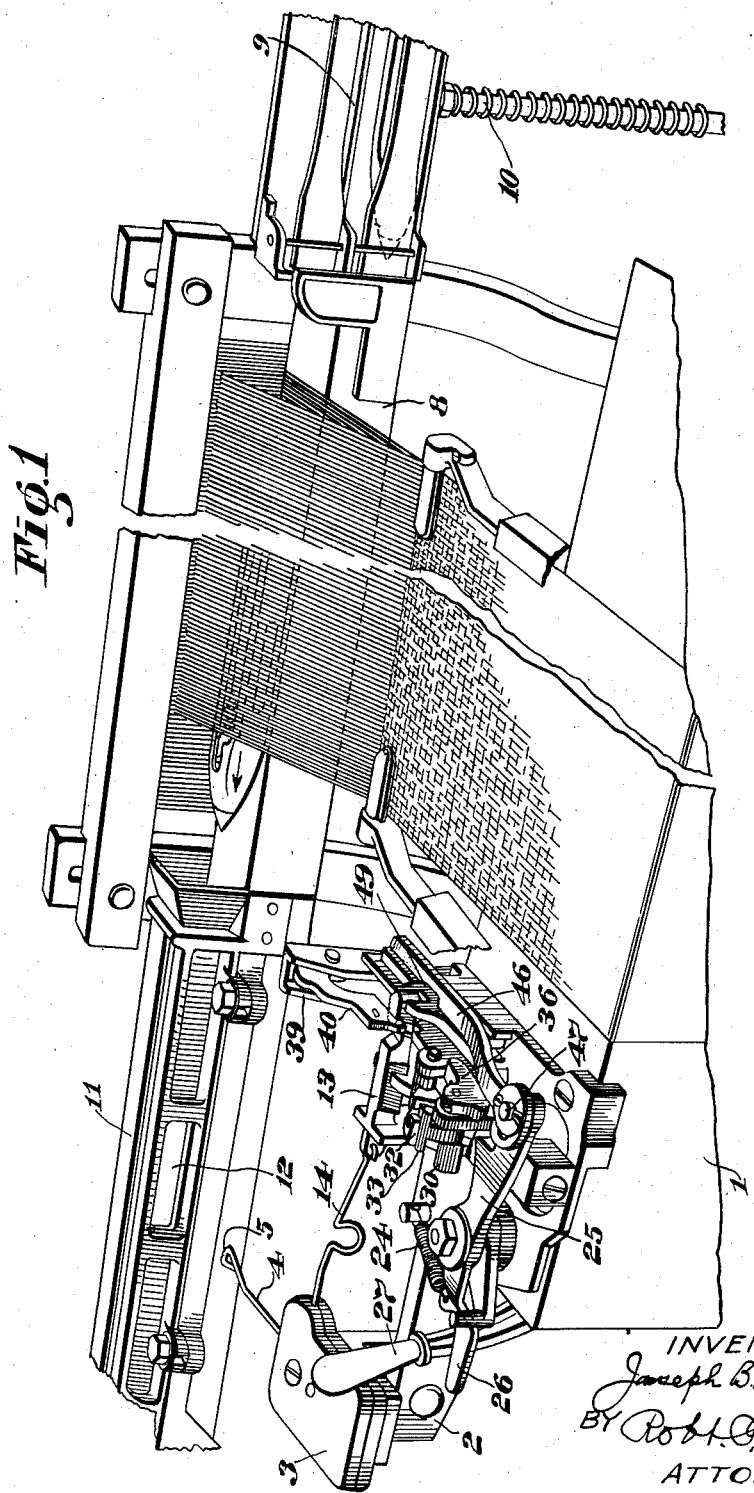

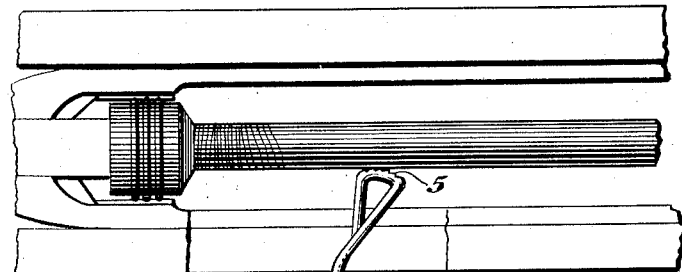
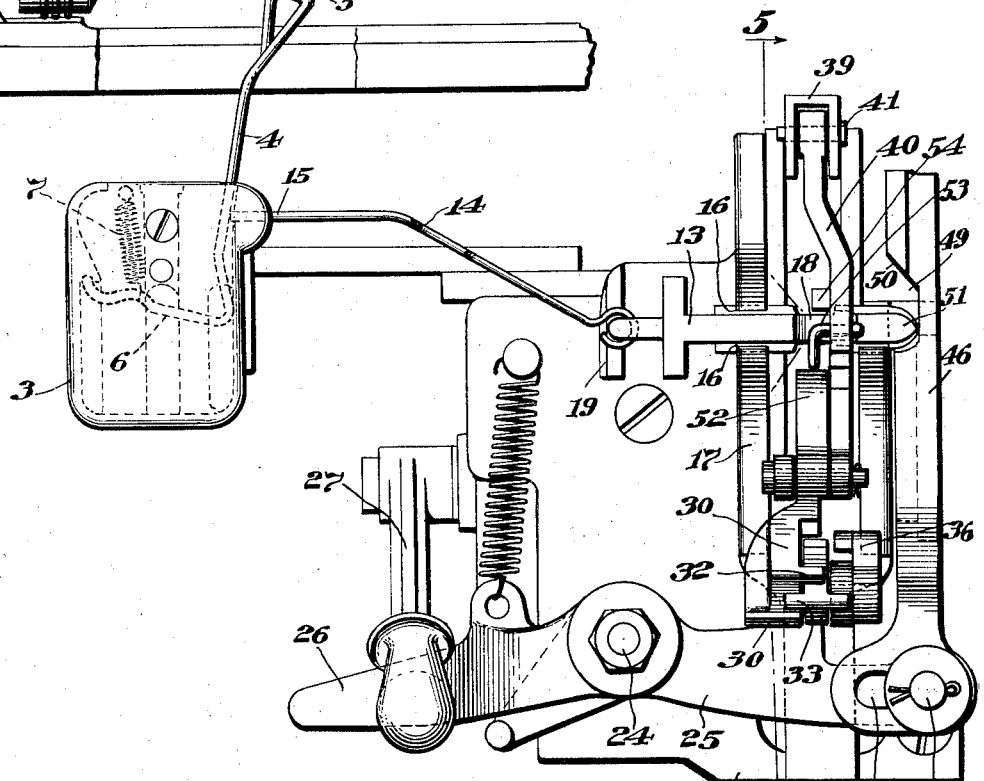

Nov. 25, 1930.  J. B. JACKSON  1,782,782
WEFT STOP MECHANISM FOR LOOMS
Filed March 14, 1930 4 Sheets-Sheet 4

INVENTOR
Joseph B. Jackson
BY Robt. O. Haines
ATTORNEY

Patented Nov. 25, 1930

1,782,782

UNITED STATES PATENT OFFICE

JOSEPH B. JACKSON, OF MILFORD, MASSACHUSETTS, ASSIGNOR TO DRAPER CORPORATION, OF HOPEDALE, MASSACHUSETTS, A CORPORATION OF MAINE

WEFT STOP MECHANISM FOR LOOMS

Application filed March 14, 1930. Serial No. 435,906.

This invention relates to weft stop mechanism for looms and more particularly to weft stop mechanisms for looms in which shifting shuttle boxes are employed at one end of the lay and a single detecting shuttle box at the other end of the lay.

In weaving certain kinds of fabrics it is desirable to lay filling in the shed by the use of two shuttles and to effect loom stoppage prior to complete exhaustion of the filling in either shuttle when the exhausted shuttle is in the single detecting box. In weaving silk fabrics, for instance, it is frequently desirable that one of the shuttles be supplied with filling of right-hand twist and the other shuttle be supplied with filling of a left-hand twist, and that the shuttles shall lay single picks of filling in two successive sheds alternately, so that when the completed fabric is finished, the desired character of fabric appearance shall result. There are other instances similar to the above where the use of two shuttles alternately operated as described produces a fabric of desired surface appearance.

In a loom employing shifting shuttle boxes at one end of the lay and a single shuttle box at the opposite end of the lay it is important that the loom shall be stopped prior to complete exhaustion of filling in the shuttle and with the exhausted shuttle in the single shuttle box preferably located at the shipper side of the loom, and where two shuttles are employed to lay two single picks of filling in successive sheds alternately and the loom is to be stopped with the exhausted shuttle in the single detecting box, it is essential that the loom stopping means be rendered operative to effect loom stoppage only after the exhausted shuttle has been returned to the single box on its alternate operation with the full shuttle.

The invention and novel features thereof to carry into effect the desired purpose, will best be made clear from the following description and the accompanying drawings of one good form thereof.

In the drawings:

Fig. 1 is a perspective view of a loom containing the present invention, some of the unessential parts being omitted;

Fig. 2 is a perspective view on an enlarged scale showing the relation of parts of the stopping mechanism prior to detection of substantial exhaustion of filling in the shuttle;

Fig. 3 is a side sectional elevation on the line 3—3 of Fig. 2;

Fig. 4 is a plan view showing the filling feeler as having detected substantial exhaustion of filling in the shuttle at the single shuttle box end of the lay, some of the parts being broken away;

Fig. 5 is a section on the line 5—5 of Fig. 4, showing the relation of parts when substantial exhaustion of filling in the shuttle has been detected by the filling feeler;

Figure 6:
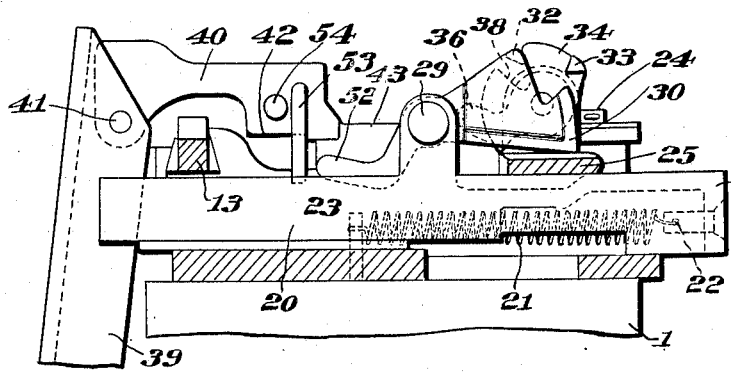
Fig. 6 is a section similar to that of Fig. 5, showing the relation of parts as the cam follower moves frontwardly following detection of substantial exhaustion of filling in the shuttle.

In the illustrated embodiment of the invention, two shifting shuttle boxes are located at one end of the lay and a single detecting shuttle box at the opposite end of the lay, and since the shuttles are to be picked from the drop boxes alternately, the latter are shifted after each second pick of a shuttle to present the other shuttle in the line of the race, but since the shuttle box shifting mechanism may be of any of the well-known types, its illustration and description herein are not necessary.

The loom frame 1 may be of usual construction and extending from the loom at the shipper side thereof is the bracket 2 on which is mounted the filling feeler, which may be of the same general type as that shown and described in the patent to Brown and Repass, No. 1,593,426, granted July 20, 1926. The feeler stand 3 is mounted on the bracket 2 and the filling feeler 4 has its rear end portion 5 provided with a series of teeth. The feeler 4 has a laterally extending arm 6, and a spring 7 normally acts upon the arm 6 to move the filling feeler into its rearward feeling position, substantially in all respects as more fully described in the patent above mentioned.

The lay 8 may be of usual character and operated in the usual well-known manner, and at one end of the lay 8 are the shifting shuttle boxes 9, two being shown in the present instance of the invention. The shifting shuttle boxes 9 are moved on alternate picks to present first one shuttle to the line of race, and upon the return of said shuttle to its shifting shuttle box, to move the other shuttle on to the line of race. To this end a rod or other appropriate means 10 is connected to the shifting shuttle boxes and operated in the usual manner to effect movement of the shuttle boxes as hereinbefore described.

At the opposite end of the lay is a single detecting shuttle box 11 which is held in fixed position on the lay and is provided with an opening 12 in the front wall thereof to enable the filling feeler to enter the shuttle box and the shuttle, as usual, to detect the condition of the filling therein.

In accordance with the present invention, a stop controller is actuated by the filling feeler when it detects substantial exhaustion of filling in one of the shuttles in the single detecting shuttle box, and such stop controller when it is moved to stop position by the feeler remains in such stop position when the filling feeler returns to its feeling position.

The stop controller as shown is constituted as a slide 13 connected to the transmitter 14, the free end portion of which passes through the side of the feeler stand into position to be engaged by the filling feeler when the latter detects substantial exhaustion of filling in the shuttle, and since the end portion 15 of the transmitter is not positively connected to the filling feeler, the stop controller 13 when moved to stop position will remain there until the loom is stopped, as will hereinafter more fully appear.

More specifically stated, the stop controller 13 extends through suitable guides 16 formed in the stand 17 which is appropriately secured to the breast beam of the loom or other suitable support, and is provided with a depression or opening 18 which, when the stop controller has been moved to stop position by the feeler detection of substantial exhaustion of filling, serves to set the stop mechanism for effecting loom stoppage when the substantially exhausted shuttle has been returned to the single detecting shuttle box. A stop 19, Fig. 2, limits the movement of the stop controller when the latter is actuated by a resetter, as will later appear.

Mounted for sliding movement on the stand 17 is a slide 20 which is normally held in rearward position by a spring 21, one end of which is connected to the slide at 22 and the other to a fixed pin 23, the result being that when not disturbed by other moving mechanism the slide will remain in its normal position, as indicated in Fig. 5.

Pivotally mounted on the loom frame or a suitable support thereof, at 24, is the shipper knock-off 25, the outer end portion 26 of which bears upon a lever 27 to throw the latter to loom stopping position and effect loom stoppage through well-known means when the shipper knock-off is actuated to stop the loom.

Rising from the slide 20 is a support 28 on which is pivotally mounted at 29 a knock-off member 30 having a notched portion 31 and a lateral projection 32 which is normally engaged by a projection 33 extending laterally from a tumbler 34 pivotally mounted on the slide at 35, and normally held in the position indicated in Fig. 5 by a weight 36, the construction being such that when the parts are related in normal position, as indicated in Fig. 5, the projection 32 will rest against the projection 33 of the tumbler and the stop member 30 be thereby held out of stopping position.

The tumbler 34 is provided with a downwardly extending tooth 37, Fig. 5, which is below the top of the knock-off lever 25, the result being that should the slide 20 be moved frontwardly, the tooth 37 will engage the rear surface of the knock-off lever 25 and cause turning movement of the tumbler, thereby releasing the projection 32 from the projection 33 and permitting the stop member 30 to drop into the position indicated in Fig. 6, wherein it will be noted that the stop member 30 will rest upon the top surface of the knock-off lever.

The frontward movement of the slide 20 is effected through the cam follower following a detection of substantial exhaustion of filling in the shuttle, as will more fully appear. As the cam follower moves rearwardly the slide 20 will also move rearwardly under the impulse of the spring 21, thereby causing the stop member 30 to drop from the top of the knock-off lever into stopping position rearwardly thereof, as indicated in Fig. 7, ready to effect loom stoppage on succeeding forward movement of the slide.

Figure 7:
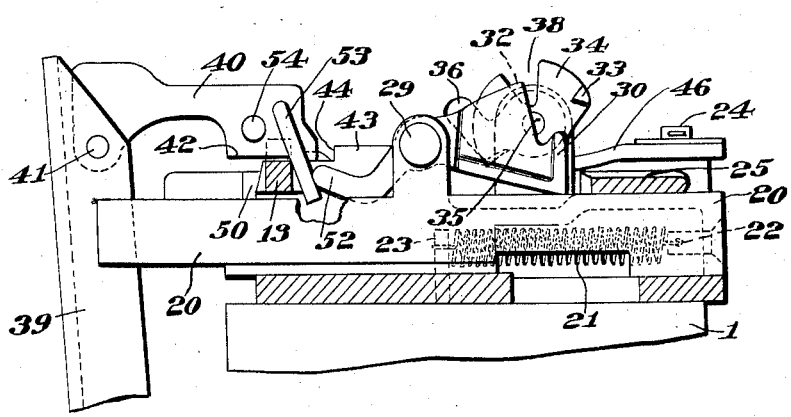
Fig. 7 is a similar view showing the relation of parts as the cam follower moves rearwardly and reaches substantially its rear position.
Figure 8:
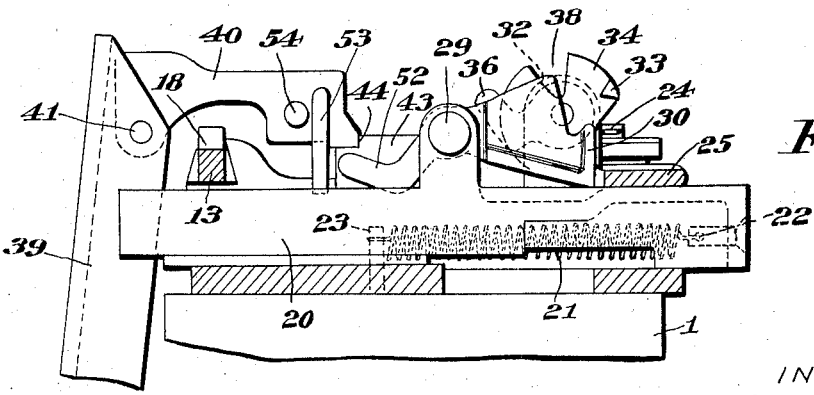
Fig. 8 is a similar view to that of Figs. 6 and 7, showing the stopping mechanism as having operated to effect loom stoppage.

With the parts in position as indicated in Fig. 7, with the cam follower in rearward position and the knock-off member 30 in knock-off position, another frontward movement of the slide 20 will cause the shipper knock-off lever to be moved from the position indicated in Fig. 7 to that of Fig. 8, and thereby effect a release of power from the loom.

In order that the tumbler 34 may be held in the position indicated in Fig. 6, the tumbler is provided with a slot or opening 38 which is engaged by the projection 32 of the knock-off member, thereby holding the tumbler with its lower end portion 37 elevated, as indicated more clearly in Figs. 6 and 7.

The cam follower 39 has movement towards the front of the loom in a one-to-two relation with the beat-up movements of the lay, and is provided with a finger 40 pivotally connected thereto at 41. The lower surface 42 of the finger 40 normally rests on the top surface of the stop controller when the latter is in loom running position or has not been moved to stop position by indication of substantial exhaustion of filling in the shuttle by the filling feeler. When, however the stop controller 13 has been moved into stop position by the filling feeler, the depression or opening 18 of the stop controller will be moved under the finger 40, thereby permitting the finger to drop into slide operating position, as indicated in Fig. 5, and when the stop controller has been moved to stop position as described it will remain there even though the filling feeler may return to feeling position, the effect being that once the filling feeler has moved the stop controller to stop position, it will remain in such position with the finger 40 lowered into slide operating position until the loom is stopped as will more fully appear.

The stop controller 13 having been moved to stop position by indication of substantial exhaustion of filling in the shuttle, the latter will be picked from the single shuttle box to the drop boxes on the opposite end of the lay as the latter goes back, and the weft hammer with its finger 40 will move frontwardly to effect movement of the slide 20 when the substantially exhausted shuttle has reached the drop box side of the loom.

The slide 20 has an upwardly extending flange 43 provided with a shoulder 44 and a rearwardly extending supporting portion 45, with the result that when the stop controller has been moved to stop position as above described and the cam follower moves frontwardly, the shoulder 44 of the slide will be engaged by the finger 40 and the slide will be moved frontwardly from the position indicated in Fig. 5 to that indicated in Fig. 6.

The shuttle boxes are now shifted to bring the fresh shuttle on the line of race, and such shuttle is picked to the single box side of the loom as the lay goes back. As the lay comes forward with the fresh shuttle in the single detecting box, the feeler will again enter the shuttle and detect the condition of the filling therein, but since the stop controller 13 has already been moved into stop position by detection of substantial exhaustion of filling in the first shuttle, it will not be influenced by any detection of the filling feeler in the fresh shuttle.

As the lay goes back and the fresh shuttle is picked to the drop box side of the loom, the cam follower will again move forwardly from the position indicated in Fig. 7 to that of Fig. 8 and when the fresh shuttle has reached the shifting shuttle box side of the loom and the lay beats up, the cam follower will move forwardly from the position of Fig. 7 to that of Fig. 8 and cause the knock-off lever 25 to throw the power from the loom with both shuttles at the shifting shuttle box side of the loom.

After the power has been thrown from the loom by the shipper knock-off lever, the momentum of the loom operation will cause the loom to turn over, the lay to go back and the substantially exhausted shuttle to be picked from the drop box side of the loom to the single detecting box and the loom will come to rest with the lay between back and front positions.

The loom attendant may then replenish by hand the exhausted shuttle and replace it in the single detecting shuttle box.

It is desirable when the power of the loom has been relieved by movement of the knock-off lever, with the resulting loom stoppage, that the stop controller 13 be again returned to its normal position under control of the filling feeler and to this end a resetter is employed, in accordance with the present invention. Having reference more particularly to Fig. 4, the resetter comprises a slide member 46, the front end portion of which is connected by a pin 47 extending through a slot 48 in the resetter and engaged with or secured to the shipper knock-off lever 25.

The rear end portion of the resetter or slide 46 is provided with an opening 49, the rear wall 50 of which is inclined, as more fully shown in Fig. 4, and when the stop controller 13 has been moved into stop position by detection of substantial exhaustion of filling in the shuttle by the filling feeler, Fig. 4, the end portion 51 of the stop controller 13 will extend into the opening 49 of the resetter or slide 46, with the result that when the resetter or slide 46 is moved frontwardly by the shipper knock-off lever 25, the end 51 of the stop controller 13 will engage the inclined surface 50 of the resetter or slide 46 and be moved back again to its normal position and into control of the filling feeler.

Inasmuch as the loom stopping means occupies the position shown in Fig. 8 when the power is relieved from the loom, and the stop member 30 is in its lowered position, as indicated in Fig. 8, means are provided for lifting the stop member 30 and again setting the tumbler 34.

In the present instance of the invention, the stop member 30 is provided with a rearwardly extending toe 52 and the finger 40 has extending downwardly therefrom an arm 53 preferably pivoted to the finger 40 and limited in its swinging movement by a pin 54, the result being that when the cam follower is moved frontwardly after the loom has been started, the arm 53 will ride over the toe 52 of the stop member, lift it from the position indicated in Fig. 8 to that indicated in Fig. 5, thereby disengaging the projection 32 on the stop member 30 from the slot 38 of the tumbler, whereupon the weight 36 of the tumbler will cause its rotative movement from the position indicated in Fig. 6 to that indicated in Fig. 5, with the projection 33 of the tumbler again engaged with the projection 32 of the stop member 30 and the parts will again be in position for subsequent weaving and detection of substantial exhaustion of filling.

It will be noted that when the stop controller 13 is in control of the filling feeler, the finger 40 will rest upon the top surface of the stop controller 13, and as the cam follower moves frontwardly its path of movement will be above the shoulder 44 of the slide 20 and the loom will continue to run. When, however, the stop controller is once moved into stop position where it remains until reset by the resetter 46, the finger 40 will be lowered into position to engage the shoulder 44 of the slide 20 to effect loom stoppage, as hereinbefore described, with the exhausted shuttle in the single detecting box at the shipper side of the loom.

What is claimed is:

1. A weft stop motion for looms employing two shifting shuttle boxes at one end of the lay and a single detecting shuttle box at the other end of the lay and two shuttles for laying two single picks of filling alternately in the sheds, the combination of a filling feeler mounted to enter the single detecting shuttle box and detect the condition of the filling on detecting beats, a single stop controller moved to stopping position by the feeler on detection of substantial exhaustion of filling in either one of the shuttles when it is in the single shuttle box and remaining in said position during the succeeding detecting beat when the second shuttle is in the single shuttle box, and means rendered operative to effect loom stoppage when the shuttle containing the substantially exhausted filling has been returned to the single detecting shuttle box.

2. In a weft stop motion for looms, the combination of the lay having drop shuttle boxes at one end and a single detecting shuttle box at the other end, a filling feeler to enter the single shuttle box on each detecting beat and detect the condition of the filling in the shuttle, a single stop controller which is moved to stopping position by the feeler upon detection of substantial exhaustion of filling in either shuttle and remaining in said position during the succeeding detecting beat when the second shuttle is in the single shuttle box, and means rendered operative by the single stop controller to effect loom stoppage when the substantially exhausted shuttle has been returned to the single shuttle box.

3. In a weft stop mechanism for looms, the combination of the lay having two shifting shuttle boxes at one end and a single shuttle box at the other end, two shuttles alternately active for two picks to lay filling in the sheds, a filling feeler to detect the condition of the filling in either shuttle when it is in the single shuttle box, a single stop controller which is moved into stop position by the feeler upon detection of substantial exhaustion of filling in either one of the shuttles in the single detecting box and remains in such position as the feeler returns to feeling position for the next detecting beat with the second shuttle in the single detecting box, and means rendered operative by the stop controller when in stop position to effect loom stoppage when the substantially exhausted shuttle again reaches the single detecting box and the lay is between front and back position.

4. A weft stop motion for looms employing two shifting shuttle boxes at one end of the lay and a single detecting shuttle box at the other end of the lay and two shuttles for laying two single picks of filling alternately in the sheds, the combination of a filling feeler mounted to enter the single detecting shuttle box and detect the condition of the filling on detecting beats, a single stop controller moved to stopping position by the feeler on detection of substantial exhaustion of filling in either one of the shuttles in the single shuttle box and remaining in said position during the succeeding detecting beat when the second shuttle is in the single shuttle box, means rendered operative to effect loom stoppage when the shuttle containing the substantially exhausted filling has been returned to the single detecting shuttle box, and means actuated by the loom stopping means for returning the stop controller to initial position.

5. In a weft stop motion for looms, the combination of the lay having drop shuttle boxes at one end and a single detecting shuttle box at the other end, a filling feeler to enter the single shuttle box on each detecting beat and detect the condition of the filling in the shuttle, a single stop controller which is moved to stopping position by the feeler upon detection of substantial exhaustion of filling in either shuttle and remaining in said position during the succeeding detecting beat when the second shuttle is in the single shuttle box, means rendered operative to effect loom stoppage when the substantially exhausted shuttle has been returned to the single shuttle box, and a stop controller resetter actuated by the loom stopping means for resetting the stop controller into operative relation with the filling feeler.

6. In a weft stop mechanism for looms, the combination of the lay having drop shuttle boxes at one end and a single detecting box at the other end, a filling feeler mounted to enter the single detecting box and shuttle therein on a detecting beat and feel for the filling, a stop controller constituted as a slide which is moved to stop position by the feeler on detection of substantial exhaustion of filling in one of the shuttles and remains in said position as the feeler returns to feeling position to detect the condition of the filling in a second shuttle, a shipper knock-off actuated to stop the loom with the exhausted shuttle in the single detecting box, and a resetter actuated by the shipper knock-off to move the stop controller again into operative relation with the filling feeler as the loom is brought to rest.

7. In a weft stop mechanism for looms, the combination of the lay having drop shuttle boxes at one end and a single detecting box at the other end, a filling feeler mounted to enter the single detecting box and shuttle therein on a detecting beat and feel for the filling, a stop controller constituted as a slide which is moved to stop position by the feeler on detection of substantial exhaustion of filling in one of the shuttles and remains in said position as the feeler returns to feeling position to detect the condition of the filling in a second shuttle, a shipper knock-off actuated to stop the loom with the exhausted shuttle in the single detecting box and a resetter constituted as a slide connected and actuated by the shipper knock-off to move the stop controller again into operative relation with the filling feeler as the loom is brought to rest.

8. In a weft stop mechanism for looms, the combination of the lay having two shifting shuttle boxes at one end and a single detecting shuttle box at the other end, two shuttles for laying two single picks of filling in the sheds alternately, a filling feeler mounted to enter the single detecting shuttle box and detect the condition of the filling in the shuttle, a single stop controller constituted as a slide having a depression and moved to stop position by the feeler on detection of substantial exhaustion of filling in either one of the shuttles, a cam follower having an actuator normally supported by the single stop controller and adapted to drop into the depression of the stop controller and thereby become operative when the latter is moved by the feeler to stop position, and means actuated by the cam follower to effect loom stoppage on the fourth pick when the exhausted shuttle is in the single detecting shuttle box.

9. In a weft stop mechanism for looms, the combination of the lay having two shifting shuttle boxes at one end and a single detecting shuttle box at the other end, two shuttles for laying two single picks of filling in the sheds alternately, a filling feeler mounted to enter the single detecting shuttle box and detect the condition of the filling in the shuttle, a single stop controller constituted as a slide having a depression and moved to stop position by the feeler on detection of substantial exhaustion of filling in either one of the shuttles, a cam follower having an actuator normally supported by the slide and adapted to drop into the depression of the stop controller when the latter is moved by the feeler to stop position, means actuated by the cam follower to effect loom stoppage on the fourth pick when the exhausted shuttle is in the single detecting shuttle box, and means positively actuated by the loom stopping means to return the stop controller slide into operative relation with the filling feeler.

10. In a weft stop mechanism for looms, the combination of the lay having two shifting shuttle boxes at one end and a single detecting shuttle box at the other end, two shuttles for laying two single picks of filling in the sheds alternately, a filling feeler mounted to enter the single detecting shuttle box and detect the condition of the filling in the shuttle, a stop controller constituted as a slide which is moved to stop position by the filling feeler on detection of substantial exhaustion of filling in the shuttle, a cam follower having a finger supported by the stop controller slide until it is moved to stop position, a shipper knock-off, means actuated by the cam follower finger to trip the shipper knock-off on the second frontward movement of the finger following the movement of the stop controller slide to stop position, and a stop controller resetter connected to the shipper knock-off to return the stop controller into operative relation with the filling feeler.

11. In a weft stop mechanism for looms, the combination of the lay having two shifting shuttle boxes at one end and a single detecting shuttle box at the other end, two shuttles for laying two single picks of filling in the sheds alternately, a filling feeler mounted to enter the single detecting shuttle box and detect the condition of the filling in the shuttle, a stop controller constituted as a slide which is moved to stop position by the filling feeler on detection of substantial exhaustion of filling in the shuttle, a cam follower having a finger supported by the stop controller slide until it is moved to stop position, a shipper knock-off, means actuated by the cam follower finger to trip the shipper knock-off on the second frontward movement of the finger following the movement of the stop controller slide to stop position, and a stop controller resetter constituted as a slide connected to the shipper knock-off and having a cam portion to return the stop controller into operative relation with the filling feeler as the shipper knock-off is actuated to stop the loom.

12. In a weft stop mechanism for looms, the combination of the lay having shifting shuttle boxes at one end and a single detecting shuttle box at its other end, a filling feeler to detect the condition of the filling in the single detecting shuttle box, a stop controller which is moved to stopping position by the feeler on detection of substantial exhaustion of the filling where it remains out of further operative relation with the feeler as the latter returns to filling feeling position, a shipper knock-off which is operated to effect loom stoppage when the exhausted shuttle has been returned to the single detecting shuttle box, and a resetter for the stop controller connected to the shipper knock-off to return the stop controller into operative relation with the filling feeler with the exhausted shuttle in the single shuttle box.

13. In a loom having a plurality of drop boxes at one side of the loom and a single box at the other side, in combination, a filling detector, loom stopping mechanism, an actuator for said stopping mechanism, a single indicating element cooperating with both of the shuttles and effective to render said actuator operative to stop the loom on substantial exhaustion of filling in either one of the shuttles, and connections whereby said single element is operatively positioned by said filling detector to effect loom stoppage with the indicating shuttle in the single box.

14. In a loom having a plurality of drop boxes at one side of the loom and a single shuttle box at the other side, in combination, a filling detector, loom stopping mechanism including a slide, a stop member mounted on the slide, a tumbler normally maintaining the stop member in non-stopping position, an actuator for the slide, a single stop controller normally maintaining the actuator in inoperative position and movable by the filling detector to permit the actuator to assume an operative position to effect movement of the slide and release of the stop member from the tumbler that the loom may be stopped on the fourth pick following an indication by the filling detector.

In testimony whereof, I have signed my name to this specification.

JOSEPH B. JACKSON.